: # 2,865,774

PLASTICIZERS FOR COATED CELLOPHANE

Preston M. Kampmeyer, Guilford, and Thomas C. Hendrickson, Wallingford, Conn., assignors to Olin Mathieson Chemical Corporation, New Haven, Conn., a corporation of Virginia No Drawing. Application August 2, 1956
Serial No. 601,629

7 Claims. (Cl. 106—178)

This invention relates to novel and improved coated films and in particular to a method for producing nitrocellulose lacquer coated film of improved properties by incorporating a plasticizer therein.

In the manufacture of lacquer coatings for regenerated cellulose sheets or films, it has long been customary to incorporate into the coating a plasticizer or softening agent in order to maintain the coated film in a flexible condition.

In the production of coated film, particularly for packaging or wrapping purposes, it is desirable to obtain film which can be readily heat sealed. In the past, attempts to make such film heat sealable has adversely affected other desirable properties of the film such as anchorage, resistance to blocking, water vapor permeability, clarity and flexibility. Another difficulty which has been encountered in the use of film heretofore available has been the necessity for special, and often complicated machinery for accomplishing the heat seals. Another difficulty is that of obtaining heat seals of sufficient strength to withstand the rough handling and extreme conditions of temperature and humidity to which such packages are exposed.

It is therefore an object of this invention to provide improved moistureproof cellophane provided with a coating comprising a lacquer base and a plasticizing component which is adapted to form moistureproof coatings characterized by being readily heat sealable.

Another object of the invention is to incorporate in lacquers and like coating compositions a glycol ester of benzoic acid in combination with another plasticizer whereby improved properties are imparted to films or coatings formed therefrom.

A further object is to provide cellophane having a plasticized moistureproof coating which can be heat sealed on conventional packaging machines.

A further object is to provide a lacquer or coating composition for regenerated cellulose of improved properties and appearance which is economical to produce.

These and other objects of the invention will be apparent in and from the following description.

In general, the invention contemplates introducing into a nitrocellulose lacquer coating a plasticizer comprising a glycol ester of benzoic acid in combination with another plasticizer.

In the manufacture of moistureproof lacquer coatings, the use of the plasticizers of this invention results in a coating possessing improved heat sealability without adversely affecting other desirable properties such as moistureproofness, anti-blocking characteristics, low water vapor permeability, clarity, etc.

The invention contemplates a non-fibrous base sheet or film of water-sensitive material, such as regenerated cellulose containing a suitable softener such as glycerol, ethylene glycol or the like, and coated with a moistureproof nitrocellulose lacquer coating.

The lacquer coating is prepared from nitrocellulose and a suitable solvent such as a mixed solvent comprising ethyl acetate, toluene and ethyl alcohol. Other constituents of the coating may include among others, in addition to the plasticizers, slip agents, anchoring agents and moistureproof agents.

Any of the soluble forms of nitrocellulose that are available commercially may be used.

The glycol esters of benzoic acid which have proved effective as plasticizers in accordance with this invention are dihydric alcohol diesters of benzoic acid such as, diethylene glycol dibenzoate, dipropylene glycol dibenzoate and polyethylene glycol dibenzoate.

The plasticizers of this invention which may be used in combination with a glycol ester of benzoic acid are phthalates, such as dibutyl or dicyclohexyl phthalate, phosphates, such as 2-ethylhexyl diphenyl phosphate, citrates, such as dibutyl citrate or di 2-ethylhexyl citrate, adiphates such as dioctyl adipate, dibutyl adipate, and sebacates such as dibutyl sebacate, dihexyl sebacate, or dioctyl sebacate.

In the preferred embodiment of the invention the total plasticizer constitutes 20–40%, preferably about 34%, by weight of the solids content of the nitrocellulose lacquer coatings formulation comprising equal parts of dipropylene glycol dibenzoate and dibutyl phthalate.

The following examples will serve to better illustrate the present invention. Percentages given are percentages by weight of the solids content of the formulation unless otherwise specified. The solvent used in all examples is a mixed solvent of 63–64% ethyl acetate, 31–32% toluene and 4–6% ethyl alcohol, although other proportions and other known solvents may be used.

EXAMPLE I

*Base sheet of regenerated cellulose containing glycerol as softener*

| | Percent |
|---|---|
| Nitrocellulose | 48 |
| Dipropylene glycol dibenzoate | 14 |
| Dibutyl phthalate | 20 |
| Diethylene glycol ester of Petrex acid [1] | 10 |
| Polymerized rosin | 5 |
| Paraffin wax | 3 |

[1] Petrex acid is a synthetic, resinous, polybasic acid of terpene origin. It consists essentially of 3-isopropyl-6-methyl-3,6-endoethylene delta-4-tetrahydro-phthalic anhydride. It has a softening point of 40–50° C. and an acid No. of approximately 530.

The above formulation produced a lacquer coating which resulted in film possessing improved heat sealability, satisfactory blocking characteristics, low water vapor permeability and improved clarity.

EXAMPLE II

*Base sheet of regenerated cellulose containing glycerol as softener*

| | Percent |
|---|---|
| Nitrocellulose | 48 |
| Diethylene glycol dibenzoate | 17 |
| Dibutyl phthalate | 17 |
| Diethylene glycol ester of Petrex acid | 10 |
| Polymerized rosin | 5 |
| Paraffin wax | 3 |

The above formulation produced a lacquer coating which resulted in film comparable to that of Example I.

EXAMPLE III

*Base sheet of regenerated cellulose containing ethylene glycol as softener*

| | Percent |
|---|---|
| Nitrocellulose | 48 |
| Polyethylene glycol 600 dibenzoate | 17 |
| Dicyclohexyl phthalate | 17 |
| Diethylene glycol ester of Petrex acid | 10 |
| Polymerized rosin | 5 |
| Paraffin wax | 3 |

The above formulation produced a film of slightly lower heat sealability but comparable with respect to other properties of the films of Examples I and II.

EXAMPLE IV

Base sheet of regenerated cellulose containing ethylene glycol as softener

|  | Percent |
|---|---|
| Nitrocellulose | 48 |
| Diethylene glycol dibenzoate | 11⅓ |
| Dibutyl phthalate | 11⅓ |
| Dicyclohexyl phthalate | 11⅓ |
| Diethylene glycol ester of Petrex acid | 10 |
| Polymerized rosin | 5 |
| Paraffin wax | 3 |

The above formulation produced a film comparable to that of Example I.

EXAMPLE V

Base sheet of regenerated cellulose containing triethylene glycol softener

|  | Percent |
|---|---|
| Nitrocellulose | 37 |
| Dipropylene glycol dibenzoate | 9 |
| Dicyclohexyl phthalate | 26 |
| Beckacite 1118 [1] | 25 |
| Paraffin wax | 3 |

[1] Beckacite 1118 is an ester gum-rosin and maleic acid glyceride mixture or complex having a melting range of 119°–215° F. and an acid number of 17–22. It is one of a series of related maleic anhydride modified ester gum resins commercially available.

EXAMPLE VI

Base sheet of regenerated cellulose containing ethylene glycol as softener

|  | Percent |
|---|---|
| Nitrocellulose | 48 |
| Dipropylene glycol dibenzoate | 8.5 |
| Dibutyl phthalate | 17 |
| Dicyclohexyl phthalate | 8.5 |
| Diethylene glycol ester of Petrex acid | 10 |
| Polymerized rosin | 5 |
| Paraffin wax | 3 |

EXAMPLE VII

Base sheet of regenerated cellulose containing glycerol as softener

|  | Percent |
|---|---|
| Nitrocellulose | 46.4 |
| 2-ethylhexyl diphenyl phosphate | 16.43 |
| Dipropylene glycol dibenzoate | 16.43 |
| Diethylene glycol ester of Petrex acid | 13 |
| Polymerized rosin | 4.83 |
| Paraffin wax | 2.90 |

Properties of film prepared according to Examples I, II, III, IV, V, VI and VII are set forth in the following table for comparison with a control film coated with a lacquer as in the above examples, except that the plasticizer consisted of 17% dibutyl phthalate and 17% dicyclohexyl phthalate.

|  | Blocking | Heat Seal, Grams | Water Vapor Permeability | Blush |
|---|---|---|---|---|
| Film of Ex. I | 3 | 35 | 71 | 1+ |
| Film of Ex. II | 2 | 22 | 38 | 1 |
| Film of Ex. III | 4 | 52 | 79 | 1+ |
| Film of Ex. IV | 3 | 67 | 54 | 1 |
| Film of Ex. V | 1+ | 25 | 35 | 1 |
| Film of Ex. VI | 2 | 32 | 25 | 1 |
| Film of Ex. VII | 2+ | 190 | 18 | 1 |
| Control film | 2 | 0 | 38 | 1 |

Blocking is defined as the tendency of a film to adhere when two or more surfaces are pressed together. The blocking values in the above table were determined in the following manner.

A stack of 30 sheets of film is stored at 45° C. for 3 days under ⅓ p. s. i. pressure. The blocking value is determined by the force required to separate individual sheets of film by grasping them between thumb and forefinger. Results are graded as follows:

Grade 1—The sheets slide apart individually with no tendency whatever to cling together.

Grade 2—The sheets slide apart individually with slight cling.

Grade 3—The sheets slide apart individually with moderate cling.

Grade 4—The stack separates into two or more groups, the individual sheets exhibiting a strong tendency to cling together.

Heat seal strength is a measure of the strength of the bond between two films when they are sealed together by heat and pressure. The following test is used to measure the strength of the heat seal bond.

Two pieces of superimposed film are sealed together at each end with a sealing bar ¾" wide heated to 93°–148° C. at 7.8 p. s. i. pressure and .25 second dwell time. Strips of these sealed sheets are placed in a Suter testing machine and pulled apart. The force in grams required to pull the strips apart is taken as a measure of the heat seal bond strength.

Water vapor permeability is the weight of water which will pass through a unit area of film per unit length of time and is determined in the following manner.

A sheet of film is sealed over a container of water maintained at 40° C. and in an atmosphere at 4% relative humidity. The loss in weight of water after 24 hours is determined and the number of grams of water which permeate 100 square meters of film in 24 hours is taken as a measure of the water vapor permeability.

Blush is measured by the degree of visible surface haze, graded as follows:

Grade 1—clean film to scarcely visible haze

Grade 1+—visible but acceptable haze

Coated films prepared according to this invention are particularly suited for wrapping and packaging materials due to their moistureproofness, transparency, clarity, heat sealability, resistance to blocking and flexibility. They possess the added advantage of being adapted for processing on conventional packaging machines, and are economical to produce.

As many widely varied embodiments of this invention may be made without departing from the spirit and scope thereof, it is to be understood that this invention is not limited to the specific embodiments thereof except as defined in the appended claims.

What is claimed and is desired to be secured by Letters Patent is:

1. A composition for preparing a moistureproof heat sealable coating for regenerated cellulose consisting essentially of a nitrocellulose lacquer having incorporated therein from 20–40% by weight of a plasticizer, said plasticizer consisting essentially of about equal parts of a dihydric alcohol diester of benzoic acid and a monohydric alcohol ester of an acid selected from the group consisting of phthalic, phosphoric, phenyl phosphoric, citric, adipic and sebacic.

2. A composition for preparing a coating for regenerated cellulose as claimed in claim 1 in which the dihydric alcohol diester of benzoic acid is dipropylene glycol dibenzoate.

3. A composition for preparing a moistureproof heat sealable coating for regenerated cellulose consisting essentially of a nitrocellulose lacquer having incorporated therein from 20–40% of a plasticizer, said plasticizer consisting essentially of a dihydric alcohol diester of benzoic acid, dibutyl phthalate and dicyclohexyl phthalate.

4. A composition for preparing a moistureproof heat sealable coating for regenerated cellulose consisting essentially of a nitrocellulose lacquer having incorporated therein from 20–40% of a plasticizer, said plasticizer consisting essentially of equal amounts of a dihydric alcohol diester of benzoic acid, dibutyl phthalate and dicyclohexyl phthalate.

5. A moistureproof heat-sealable film of regenerated cellulose having a coating of nitrocellulose and 20–40% by weight of plasticizer, said plasticizer consisting essentially of about equal parts of a dihydric alcohol diester of benzoic acid and a monohydric alcohol ester of an acid selected from the group consisting of phthalic, phosphoric, phenyl phosphoric, citric, adipic, and sebacic.

6. A composition for preparing a coating for regenerated cellulose as claimed in claim 1 in which the dihydric alcohol diester of benzoic acid is diethylene glycol dibenzoate.

7. A composition for preparing a coating for regenerated cellulose as claimed in claim 1 in which the dihydric alcohol diester of benzoic acid is polyethylene glycol 600 dibenzoate.

References Cited in the file of this patent

UNITED STATES PATENTS

| | | |
|---|---|---|
| 1,824,285 | Matson | Sept. 22, 1931 |
| 1,989,683 | Cornwell | Feb. 5, 1935 |
| 2,455,581 | Hitchens | Dec. 7, 1948 |
| 2,487,106 | Cornwell | Nov. 8, 1949 |